United States Patent
Sun et al.

(10) Patent No.: US 12,021,281 B2
(45) Date of Patent: Jun. 25, 2024

(54) MULTI-FUEL FUEL CELL SYSTEM AND OPERATION METHOD THEREOF

(71) Applicant: DALIAN INSTITUTE OF CHEMICAL PHYSICS, CHINESE ACADEMY OF SCIENCES, Liaoning (CN)

(72) Inventors: Gongquan Sun, Liaoning (CN); Jicai Huang, Liaoning (CN); Suli Wang, Liaoning (CN)

(73) Assignee: Dalian Institute of Chemical Physics, Chinese Academy of Sciences, Liaoning (CN)

( * ) Notice: Subject to any disclaimer, the term of this patent is extended or adjusted under 35 U.S.C. 154(b) by 623 days.

(21) Appl. No.: 17/121,687

(22) Filed: Dec. 14, 2020

(65) Prior Publication Data

US 2021/0126271 A1   Apr. 29, 2021

Related U.S. Application Data

(63) Continuation-in-part of application No. PCT/CN2018/121488, filed on Dec. 17, 2018.

(30) Foreign Application Priority Data

Dec. 14, 2018   (CN) .......................... 201811531870.6

(51) Int. Cl.
*H01M 8/06* (2016.01)
*H01M 8/04007* (2016.01)
(Continued)

(52) U.S. Cl.
CPC ..... *H01M 8/0618* (2013.01); *H01M 8/04022* (2013.01); *H01M 8/04074* (2013.01);
(Continued)

(58) Field of Classification Search
CPC ........... H01M 8/0618; H01M 8/04014; H01M 8/04022; H01M 8/2425; H01M 8/04074; H01M 8/12
See application file for complete search history.

(56) References Cited

U.S. PATENT DOCUMENTS

| | | | |
|---|---|---|---|
| 6,702,991 B1 * | 3/2004 | Smaling | C01B 3/38 422/186.21 |
| 2003/0021742 A1 * | 1/2003 | Krause | C01B 3/382 422/607 |

(Continued)

FOREIGN PATENT DOCUMENTS

| | | |
|---|---|---|
| CN | 101572323 A | 11/2009 |
| CN | 101796680 A | 8/2010 |
| WO | 2018092479 A1 | 5/2018 |

*Primary Examiner* — Jeremiah R Smith
(74) *Attorney, Agent, or Firm* — NKL Law; Allen Xue

(57) ABSTRACT

A multi-fuel fuel cell system is based on the distributed hydrogen production and fuel cell technologies is presented. The system includes fuel supply unit, fuel processor, fuel cell, heat exchange and oxidizer supply units. The fuel processor is a plasma-catalytic reformer. The heat exchange unit is a multiflow heat exchanger which is of a cascading structure from bottom top or a concentric cylinder structure from inside to outside. The multiflow heat exchanger has the function of balancing the heat of fuel processor and fuel cell. The fuel storage is connected to the fuel processor by the pipeline and provides fuel for the fuel processor. The outlet of fuel processor is connected via the multiflow heat exchanger to the fuel cell anode, and provides reactant for the fuel cell.

12 Claims, 2 Drawing Sheets

(51) Int. Cl.
    *H01M 8/04014*     (2016.01)
    *H01M 8/04082*     (2016.01)
    *H01M 8/0612*     (2016.01)
    *H01M 8/12*     (2016.01)
    *H01M 8/2425*     (2016.01)

(52) U.S. Cl.
    CPC ......... *H01M 8/04201* (2013.01); *H01M 8/12* (2013.01); *H01M 8/2425* (2013.01)

(56) References Cited

U.S. PATENT DOCUMENTS

| | | | |
|---|---|---|---|
| 2004/0197622 A1* | 10/2004 | Wheat | B01D 45/12 429/413 |
| 2005/0118474 A1* | 6/2005 | Ettwein | H01M 8/04029 429/441 |
| 2006/0276332 A1* | 12/2006 | Shore | B01J 37/0205 502/326 |
| 2007/0111053 A1* | 5/2007 | Penev | B01J 8/0496 422/198 |
| 2007/0202366 A1* | 8/2007 | Kim | H01M 8/1023 429/429 |
| 2009/0029204 A1* | 1/2009 | Venkataraman | H01M 8/04014 429/465 |
| 2011/0053027 A1 | 3/2011 | Weingaertner et al. | |
| 2015/0207157 A1* | 7/2015 | Ono | H01M 8/04007 429/408 |
| 2015/0299879 A1* | 10/2015 | Fahimi | C25B 15/02 204/229.2 |
| 2019/0252700 A1* | 8/2019 | Miura | H01M 8/04313 |
| 2020/0243888 A1* | 7/2020 | Gervasio | F04B 45/04 |

\* cited by examiner

MULTI-FUEL FUEL CELL SYSTEM AND OPERATION METHOD THEREOF

FIELD OF TECHNOLOGY

This disclosure relates generally to fuel cell system based on the distributed hydrogen production, and more particularly to a fuel cell system containing HT-PEMFC and gliding arc plasma reformer.

BACKGROUND

Methanol, ethanol, gasoline and diesel are more readily available than hydrogen. However, these fuels cannot be directly used as reactants for the proton exchange membrane fuel cells (PEMFCs), which requires that these fuels should be converted to hydrogen before entering into the PEMFCs. Generally, the conversion takes place with the participation of the catalyst, which has problems such as low space velocity, unique feed, long preheating times and soot formation. To overcome these problems, in this disclosure, plasma is used to reform multi-fuel (such as methanol, ethanol, gasoline and diesel) to a hydrogen rich gas. After the plasma reforming, the catalytic reforming and water gas shift reaction is employed to improve the hydrogen concentration for the fuel cell use. The technology will promote the application of the fuel cell technology.

The outlet gas of plasma reactor has a relatively high temperature so that it cannot be directly used to the proton exchange membrane fuel cell. To solve the problem, a multiflow heat exchanger is used. The heat exchanger allows the heat transfer between cold streams and hot streams in the system, which decreases the temperature of the gas entering into the fuel cell and preheats the temperature of feed. The introduction of exchanger realizes the optimum utilization of heat and makes the plasma reactor possible to be used in the fuel cell system. The disclosure eliminates the fuel constraint of fuel cell system, and allows multiple fuels to be used for the fuel cell system.

DETAILED DESCRIPTION

To use multiple fuels in the fuel cells, the present disclosure provides a method which combines plasma catalytic reforming multi-fuel for hydrogen production and HT-PEMFC technology. The technology has the following advantages: multi-fuel feed which is easily available; the reactor is compact, has a high power density, and a lower operating temperature compared to the solid oxide fuel cell. The heat produced in the system is optimally utilized which is beneficial to improve the efficiency of the system.

The present disclosure provides a method that combines non-thermal plasma catalytic reforming multi-fuel for hydrogen production and HT-PEMFC technology. Liquid fuel has two ways to enter the plasma reactor. It can be atomized into small droplets in the air-assisted atomization nozzle installed on the top of the reactor. Also, it can be preheated by the heat exchanger, and then mixes with the preheated air and steam from the heat exchanger. Then, the gas mixture enters into the plasma reactor between the gap between electrodes in the plasma reactor. The gas between the electrodes is ionized to produce the plasma. The plasma is propelled to the center of the reactor by the gas flow. In the plasma region, the fuel reacts with plasma, air and steam, and is converted to a hydrogen rich gas containing hydrogen, carbon monoxide, methane, ethane, ethylene, carbon dioxide, water and nitrogen. To improve hydrogen yield, a catalytic reforming section which converts methane, ethane and ethylene to syngas follows the plasma region. The product gas from the plasma reactor is at a relatively high temperature and is delivered to the shift section of the heat exchanger. The shift compartment is filled with a high temperature water gas shift catalyst, a low temperature water gas shift catalyst, and optionally some steam catalyst reforming catalyst, which converts carbon monoxide and steam to hydrogen and carbon dioxide. While flowing through the shift compartment, the product gas is cooled down by the cold flow in the adjacent channel, and is delivered to the anode of the high temperature PEMFC for electrochemical reaction.

Tail gas that includes a small amount of unreacted hydrogen is delivered to the catalytic combustion compartment of heat exchanger, where the unreacted gas is combusted and discharged. The released heat is used to preheat water. The combustion catalyst is a monolith, which can reduce the pressure drop. The heat transfer oil from stack is cooled down by the heat exchanger, and returns to the heat transfer oil compartments of stack to take heat produced by fuel cell. Heat released by heat transfer oil in the heat exchanger is used to preheat water and air. The preheated air is applied to purge inner wall of plasma reactor, which avoid or relieve carbon deposit resulting from collisions between the atomized droplets and the inner wall of plasma reactor.

A multi-fuel based fuel cell system comprises fuel supply unit, fuel processor, fuel cell, heat exchange and oxidizer supply units. The fuel supply unit includes a fuel storage and pipelines.

The fuel processor is a plasma reactor which comprises high voltage and ground electrodes. The reactor involves fuel inlet, oxidizer inlet and product outlet, and is used to convert fuel to mixture of hydrogen and carbon monoxide.

The type of fuel cell unit used in the system is high temperature fuel cell stack which includes inlet and outlet of anode and cathode.

The heat exchange unit is a multiflow heat exchanger which is of a cascading structure from bottom to top or a concentric cylinder structure from inside to outside. The multiflow heat exchanger has the function of balancing the heat of fuel processor and fuel cell.

The oxidizer supply unit is connected to the fuel cell cathode and the inlet of fuel processor, respectively, and provides oxidant for the fuel cell and fuel processor units.

The fuel storage is connected to the fuel processor by the pipeline and provides fuel for the fuel processor. The outlet of fuel processor is connected via the multiflow heat exchanger to the fuel cell anode, and provides reactant for the fuel cell.

The multiflow heat exchanger includes a compartment for the water gas shift reaction. The compartment that improves the hydrogen concentration and reduces the carbon monoxide concentration is filled with catalyst for the shift reaction. The product of fuel processor is delivered via the shift compartment of the heat exchanger to the fuel cell anode.

The compartment for shift reaction is filled with high and low temperature shift catalysts. The temperature tolerance of the catalyst decreases along the flow direction.

The shift compartment is filled with three types of water gas shift catalysts. The active components of catalyst is platinum/nickel, iron and copper along the flow direction.

On the two sides of the shift compartment are respectively fuel/steam mixture preheating compartment and the fuel preheating compartment.

The multiflow heat exchanger includes a catalytic combustion compartment which is apart from the shift compartment. The catalytic combustion compartment is filled with combustion catalyst. Mixture of tail gas of fuel cell anode (or combustible gas at the startup) and air is delivered to the catalytic combustion compartment, and is discharged after combustion.

The multiflow heat exchanger includes a compartment for the heat transfer medium, and it is adjacent to the shift compartment. The fuel cell comprises channels for the heat transfer medium and is connected to the compartment of heat transfer medium. Heat transfer medium is cycled between the two units.

The multiflow heat exchanger has the heat transfer medium channel is adjacent to both the the shift compartment and the catalytic combustion compartment. The fuel cell comprises channels for the heat transfer medium and is connected to the compartment of heat transfer medium. Heat transfer medium is cycled between the two units.

The multiflow heat exchanger contains a heat transfer medium compartment and an air preheating compartment. One side of the steam/air mixture preheating compartment is adjacent to the shift compartment or the catalytic combustion compartment, the other side is adjacent to the heat transfer medium compartment. The fuel cell comprises channels for the heat transfer medium and is connected to the compartment of heat transfer medium. Heat transfer medium is cycled between the two units.

The multiflow heat exchanger contains a compartment for water preheating. The water preheating compartment is adjacent to the heat transfer medium compartment.

The multiflow heat exchanger contains a heat transfer medium compartment and a water preheating compartment. One side of the water preheating compartment is adjacent to the shift compartment or the catalytic combustion compartment, the other side is adjacent to the heat transfer medium compartment. The fuel cell comprises channels for the heat transfer medium and is connected to the compartment of heat transfer medium. Heat transfer medium is cycled between the two units.

The multiflow heat exchanger contains an air preheating compartment, which is adjacent to the heat transfer medium compartment.

The heat transfer medium for the multiflow heat exchanger and fuel cell is a heat transfer oil.

The compartments for fuel preheating, steam/air preheating, heat transfer medium, water preheating and air preheating all have fins disposed thereon.

The active component of the combustion catalyst is platinum.

The oxidizer supply unit is air pump or compressor, and the fuel cell cathode is connected to the air pump or compressor.

The multi-fuel can be methane, methanol, ethanol, gasoline, diesel, dimethyl ether, biodiesel or their mixture.

The type of fuel cell stack is high temperature proton exchange membrane fuel cell (HT-PEMFC), and the operating temperature is 120-200° C.

A method of operating the system, comprising:

The fuel storage provides fuel to the fuel processor, and the oxidizer supply unit provides oxidant to the fuel processor. Start the fuel processor and make sure outlet of the fuel processor connected to shift compartment inlet of heat exchanger unit. In the shift compartment, the product of fuel processor is cooled down, and hydrogen concentration is increased and carbon monoxide concentration is decreased after the shift reaction.

At the startup phase of the system, liquid fuel is delivered via the atomizing nozzle to the fuel processor, and it is completely or partly combusted by adjusting the ratio of oxidizer and fuel. The produced gas is delivered via shift compartment of the heat exchange unit to the fuel cell, and then to the catalytic combustion compartment of the heat exchange unit. Or the produced gas is delivered via shift compartment to the catalytic combustion compartment of the heat exchange unit, without entering into the fuel cell. The combustible components in the produced gas is further catalytically combusted, and the tail gas is discharged from the outlet of the catalytic combustion compartment. Heat released from catalytic combustion is used to preheat the system.

The heat transfer medium is cycled between the compartment of heat exchange unit and channels of fuel cell to heat up the fuel cell stack at startup phase. The outlet of shift compartment is connected to the fuel cell anode, and the oxidizer supply unit is connected to the fuel cell cathode for oxidant supply. At steady state, heat generated by the fuel cell is transferred by the heat transfer medium to the compartment of heat exchange unit where the medium is cooled down. The cooled medium is cycled to the fuel cell stack to cool the fuel cell stack.

The method of claim further comprising following:

Mixture of air and steam is delivered via the steam/air mixture preheating compartment of heat exchanger to the fuel processor.

Air is delivered via air preheating compartment of the heat exchanger to the fuel processor.

Water is delivered via water preheating compartment of the heat exchanger to the fuel processor.

Fuel storage is connected via heat exchange unit, in which the fuel is preheated, to the fuel processor.

Tail gas of fuel cell anode is delivered to the catalytic combustion compartment of heat exchanger, and then is discharged.

The advantage of this technology is that it is not constrained by the type of fuel or the state of fuel so that locally available fuel can be used to generate electricity. The reactor has a compact structure and a high power density. Compared with solid state oxidant fuel cell system, the system of the current disclosure generates electricity at a low temperature and is safe and reliable. The system has an optimal heat balance, which effectively improves the heat efficiency of the system.

DESCRIPTION OF FIGURES

In FIG. 1, 1. fuel pump; 2. compressor; 3. air assisted atomizing nozzle; 4. water pump; 5. multi-channel heat exchanger; 6. plasma reactor (the bottom part is the catalytic reforming section); 7. high voltage power source; 8. air pump; 9. fuel cell stack; 10. air pump for cathode; 11. heat transfer oil pump

EMBODIMENTS

Figure 1:
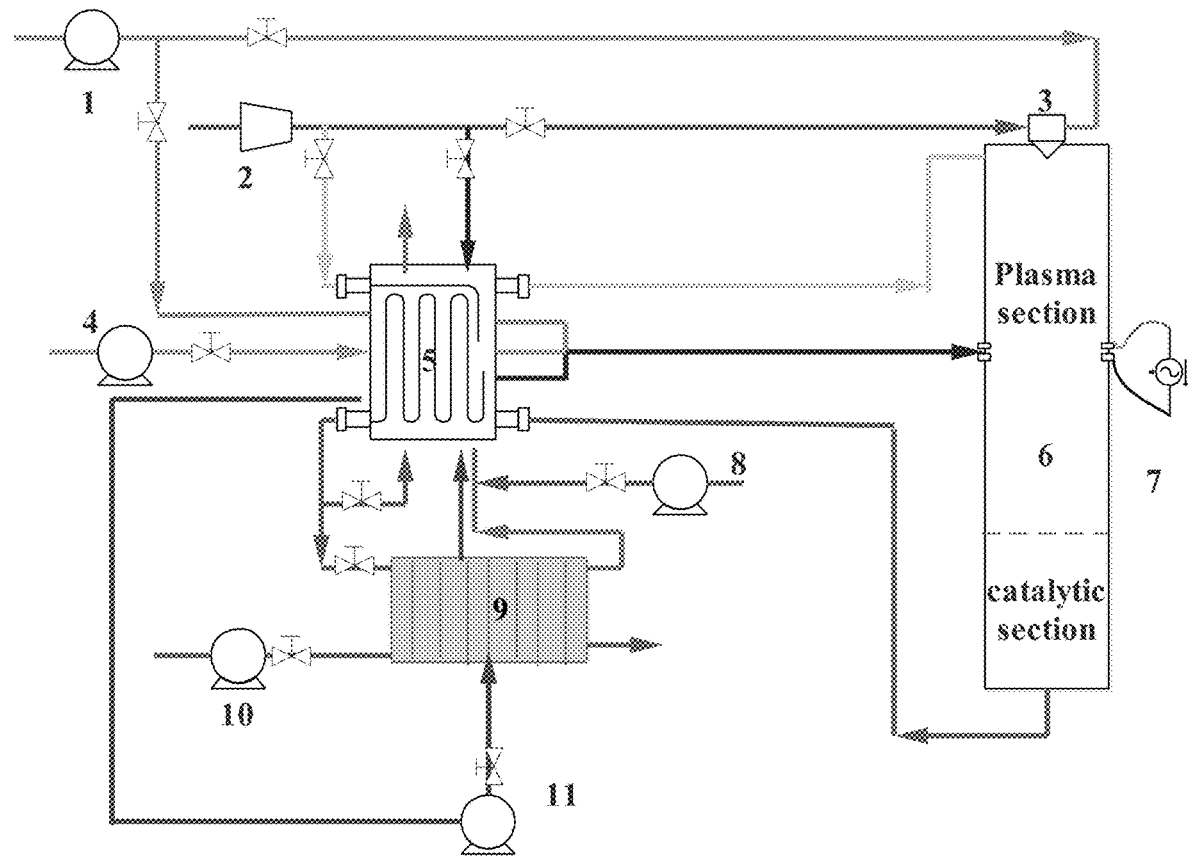
FIG. 1 is a flow diagram of the multi-fuel based fuel cell system.
Figure 2:
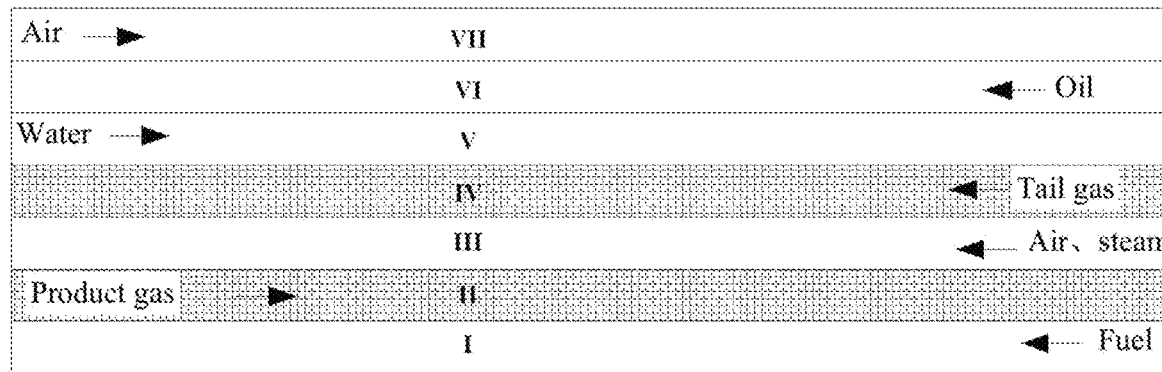
FIG. 2 is the schematic diagram showing flow pattern of the multiflow plate fin heat exchanger.

A multi-fuel based fuel cell system, as shown in FIG. 1, comprises fuel supply unit, fuel processor, fuel cell, heat exchange and oxidizer supply units.

The fuel processor is a plasma reactor which comprises high voltage and ground electrodes. An air-assisted atomization nozzle is installed on the top of the reactor. The middle part of the reactor is plasma reforming section and the lower part is catalytic reforming section which is filled with reforming catalyst. The outlet is set at the bottom of the reactor. One inlet of the atomizing nozzle is connected to the fuel storage via the fuel pump and pipeline, the other inlet of the nozzle is connected to the outlet of the air compressor. The upper section of the reactor has an air inlet, from which the purging air is introduced to the inner wall of the reactor. The inlet is connected to the outlet of compressor via the multiflow heat exchanger. The side wall of the plasma reactor involves a feed inlet. Water is pressurized via pump to the exchanger, where it is preheated and vaporized, and is mixed with air from the compressor. The mixture is further preheated and mixed with the preheated/vaporized fuel which is delivered via fuel pump from the fuel storage. The final mixture is delivered via the feed inlet to the gap between high voltage and ground electrodes in the plasma reactor. The product from the outlet of plasma reactor is delivered via heat exchanger to the inlet of fuel cell anode.

The fuel cell unit includes fuel inlet and tail gas outlet of anode, and inlet and outlet of cathode. Tail gas from fuel cell anode mixes with air, and is delivered to the heat exchanger where the combustible gas is burned. Then the exhaust gas is discharged.

Heat transfer medium of fuel cell is delivered via pump to fuel cell, enters into the heat exchanger, and then returned to the fuel cell.

The heat exchanger is a multiflow heat exchanger which includes seven compartments arranged in a cascading structure from bottom to top or a concentric cylinder structure from inside to outside From bottom to up or inside to outside:
fuel preheating compartment which includes the first inlet and outlet.
water gas shift compartment which is filled with three sections of catalysts. From the inlet to the outlet, the active component of catalysts is nickel, iron and copper. The shift compartment includes the second inlet and outlet.
mixture of air and steam preheating compartment which includes the third inlet and outlet.
catalytic combustion compartment for tail gas of fuel cell which is filled with combustion catalyst, and the active component of the catalyst is platinum. The catalytic combustion compartment includes the fourth inlet and outlet.
water preheating compartment which includes the fifth inlet and outlet.
heat transfer medium compartment which includes the sixth inlet and outlet.
air preheating compartment which includes the seventh inlet and outlet.

Fuel from fuel storage of fuel supply unit is delivered via the first inlet and outlet to the fuel processor. The oxidizer supply unit comprises three streams. The streams are delivered via the third, fifth and seventh inlets and outlets respectively to the inlet of fuel processor. After reaction between fuel and oxidant, the product is discharged from the outlet of the fuel processor.

The outlet of fuel processor is connected to the fuel cell anode via the second inlet and outlet of the heat exchange unit.

Tail gas of fuel cell anode is delivered to the fourth inlet of heat exchange unit. After catalytic combustion, the exhaust gas is discharged from the fourth outlet.

Heat transfer medium of fuel cell flows through fuel cell to the sixth inlet of heat exchange unit. After preheating or cooling, it is delivered via the sixth outlet of heat exchange unit to the fuel cell. The heat transfer medium is cycled in the system.

Figure 3:
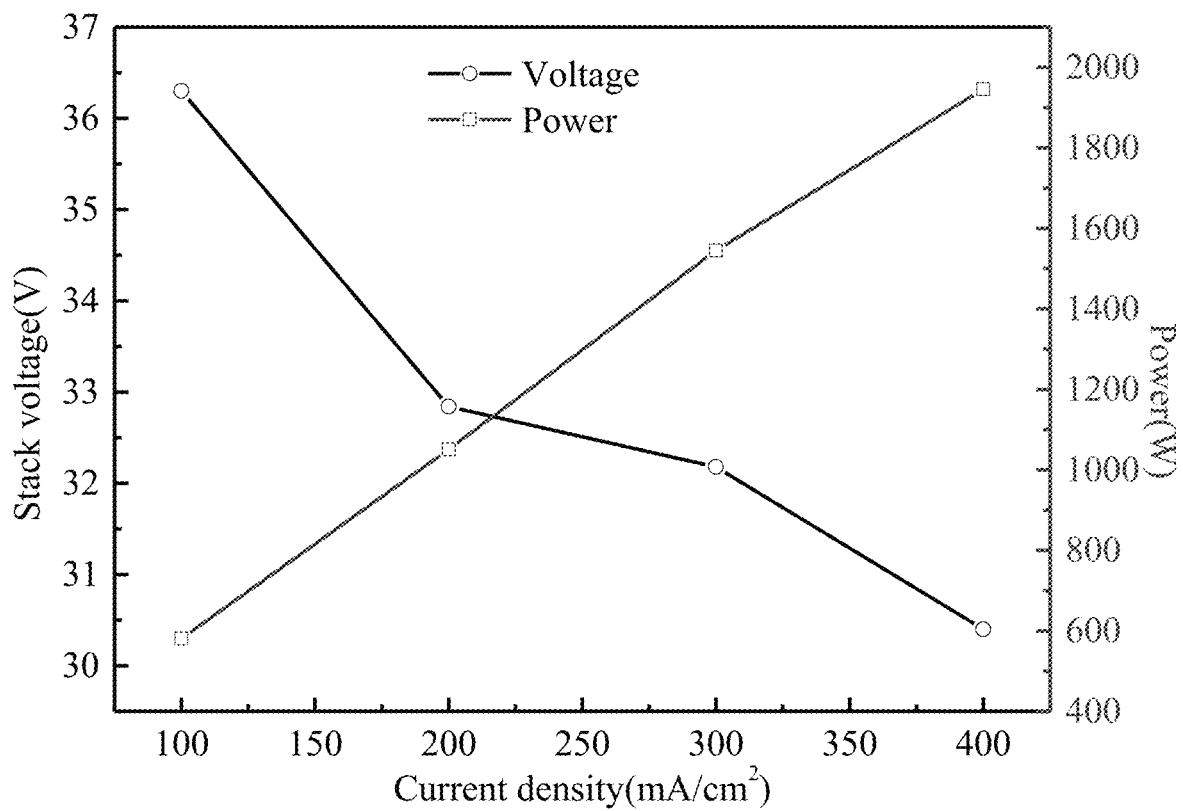
FIG. 3 is discharge curve of the fuel cell system.

In the system operation, ethanol is taken as an example. Lower part of the plasma reactor is filled with the reforming catalyst whose active component is nickel. From inlet to outlet of the second compartment of heat exchanger, the active component of water gas shift catalyst is nickel, iron and copper. The fourth compartment of heat exchanger is filled with combustion catalyst. At startup, liquid ethanol is delivered via the atomizing nozzle to the fuel processor, and the flow rate is 5-15 ml/min. Adjusting the flow rate of air to make sure fuel is completely combusted, and the released heat is used to preheat the system. At steady state, ethanol is delivered to the first compartment of heat exchanger rather than to the atomizing nozzle. After preheating and evaporation, ethanol mixes with mixture of air and steam from the third compartment of heat exchanger, and enters into the plasma reactor from the middle inlet. The flow rate of ethanol is 35 ml/min, the steam to carbon ratio ($H_2O/C$) is 1.85, the oxygen-to-carbon ratio (O/C) is 0.58. The outlet gas of plasma reactor is delivered to the second compartment of heat exchanger where it is cooled down and the water gas shift reaction occurs. The product gas has about 40% (molar composition) hydrogen and less than 3% (molar composition) carbon monoxide. The product gas is delivered to the fuel cell anode where the discharge is realized. The relationships of current, voltage and power are shown in FIG. 3.

For the shutdown of the system, firstly turn off the fuel and water pumps, then adjust the air to about 1 $m^3$/h and stop power discharge of fuel cell. Keep the air feeding for about 1 min, then stop the air compressor, lastly turn off the heat transfer oil pump. The invention has the advantages of small size, quick start, high power density and compactness, and can convert ethanol to the hydrogen rich gas for fuel cell application, which is beneficial to the promotion and application of fuel cell technology.

We claim:

1. A multi-fuel based fuel cell system, comprising: a fuel pump, an oxidizer supply unit, a water pump, a plasma reactor, a multiflow heat exchanger, and a fuel cell stack, wherein:
the oxidizer supply unit comprises one or more air compressor, air pump, or both;
the fuel pump and the oxidizer supply unit are each connected to an atomizer disposed on a first end of a plasma reactor;
the plasma reactor comprises a plasma reforming section proximate to the atomizer and a catalytic reforming section distal to the atomizer, the plasma reforming section has a high voltage electrode and a ground electrode disposed therein, the catalytic reforming section contains a reforming catalyst and has an outlet connected to the multiflow heat exchanger;
the fuel cell stack has an oxidizer inlet connected to the oxidizer supplier unit, a reforming gas inlet connected to the multiflow heat exchanger, an anode outlet, and a cathode outlet;
the multiflow heat exchanger comprises an inlet connected to the outlet of the plasma reactor, a water inlet connected to the water pump, a first oxidizer inlet and a second oxidizer inlet connected to the oxidizer supply unit, a reforming gas outlet connected to the reforming gas inlet of the fuel cell stack; and
during operation, water, a fuel, and an oxidizer are preheated and/or vaporized in the multiflow heat exchanger, and a mixture of the preheated and/or vaporized water, fuel, and oxidizer is delivered to an inlet in the plasma reforming section of the plasma reactor.

2. The system of claim 1, wherein the multiflow heat exchanger comprises a shift reaction compartment that contains a water gas shift catalyst to catalyze a water gas shift reaction to produce a reforming gas.

3. The system of claim 2, wherein the water gas shift catalyst comprises a high temperature shift catalyst and a low temperature shift catalyst arranged in a direction of flow in the shift reaction compartment.

4. The system of claim 3, the water gas shift catalyst further comprises a third shift catalyst, and the water gas shift catalyst is disposed in a manner so that platinum/nickel, iron, and copper are arranged in the direction of flow in the shift reaction compartment.

5. The system of claim 2, wherein the shift reaction compartment is sandwiched between a fuel compartment for fuel preheating and a steam/air compartment for preheating steam and air.

6. The system according to claim 2, wherein the multiflow heat exchanger further comprises a catalytic combustion compartment containing a combustion catalyst, wherein the catalytic combustion compartment is fluidly connected with the anode outlet of the fuel cell stack.

7. The system according to claim 6, wherein the combustion catalyst comprises platinum.

8. The system according to claim 2, wherein the multiflow heat exchanger further comprises a compartment that contains a heat transfer medium and is fluidly connected to the fuel cell, wherein a circulating pump circulates the heat transfer medium between the multiflow heat exchanger and the fuel cell stack.

9. The system of claim 8, the multiflow heat exchanger further comprises a compartment for air preheating adjacent to the heat transfer medium compartment.

10. The system according to claim 8, the heat transfer medium is a heat transfer oil.

11. The system of claim 1, wherein, during operation, the fuel pump transports the fuel selected from methane, methanol, ethanol, gasoline, diesel, dimethyl ether, biodiesel, or mixtures thereof to the atomizer disposed at the first end of the plasma reactor.

12. The system of claim 1, wherein the fuel cell stack comprises a high temperature proton exchange membrane fuel cell (HT-PEMFC) having an operating temperature 120-200° C.

* * * * *